United States Patent
Marquardt et al.

(10) Patent No.: US 8,890,465 B2
(45) Date of Patent: Nov. 18, 2014

(54) CIRCUIT ARRANGEMENT FOR MODULAR DRIVE POWER CONVERTERS

(75) Inventors: Rainer Marquardt, Rimerling (DE); Nikolaus Michels, Ottobrunn (DE)

(73) Assignee: ECPE Engineering Center for Power Electronics GmbH, Nuremberg (DE)

(*) Notice: Subject to any disclaimer, the term of this patent is extended or adjusted under 35 U.S.C. 154(b) by 130 days.

(21) Appl. No.: 13/581,282

(22) PCT Filed: Jan. 31, 2011

(86) PCT No.: PCT/EP2011/000424
§ 371 (c)(1),
(2), (4) Date: Nov. 2, 2012

(87) PCT Pub. No.: WO2011/103959
PCT Pub. Date: Sep. 1, 2011

(65) Prior Publication Data
US 2013/0049659 A1    Feb. 28, 2013

(30) Foreign Application Priority Data

Feb. 24, 2010  (DE) .......................... 10 2010 008 978

(51) Int. Cl.
| | | |
|---|---|---|
| *H02P 27/04* | (2006.01) | |
| *H02P 9/00* | (2006.01) | |
| *H02M 7/797* | (2006.01) | |
| *H02M 1/00* | (2006.01) | |
| *H02M 7/483* | (2007.01) | |

(52) U.S. Cl.
CPC ...... *H02M 7/797* (2013.01); *H02M 2001/0074* (2013.01); *H02P 9/006* (2013.01); *H02M 2007/4835* (2013.01)
USPC ............ 318/800; 318/722; 318/801; 363/40; 363/55; 363/132; 363/137

(58) Field of Classification Search
USPC ............ 318/800, 801, 400.01, 701, 722, 727, 318/799, 400.23; 363/21.11, 21.18, 22, 32, 363/34, 40, 41, 55, 104, 132, 44, 71, 95, 363/102, 105, 109, 124, 137, 157
See application file for complete search history.

(56) References Cited

U.S. PATENT DOCUMENTS

| | | | |
|---|---|---|---|
| 6,519,169 B1 * | 2/2003 | Asplund et al. | ............... 363/132 |
| 7,420,825 B2 | 9/2008 | Vinciarelli | |

(Continued)

FOREIGN PATENT DOCUMENTS

| | | |
|---|---|---|
| DE | 10103031 | 7/2002 |
| DE | 10114075 | 10/2002 |
| DE | 102007013462 | 9/2008 |
| WO | WO 00/62409 | 10/2000 |

OTHER PUBLICATIONS

Bin Wu et al., "Current-Source Converter and Cycloconverter Topologies for Industrial Medium-Voltage Drives," *IEEE Transactions on Industrial Electronics, IEEE Service Center* 55(7):2786-2797, Jul. 1, 2008.

(Continued)

*Primary Examiner* — Antony M Paul
(74) *Attorney, Agent, or Firm* — Klarquist Sparkman, LLP (57) ABSTRACT

The invention relates to power converter circuits which are suitable, in particular, for mobile drive systems with stringent requirements in terms of weight minimization and availability as well as direct attachment to rotating field machines. Inter alia, the strictly modular design of the electronics and the very low expenditure on passive filter elements by virtue of the principle involved are characteristic.

20 Claims, 8 Drawing Sheets

(56) References Cited

U.S. PATENT DOCUMENTS

2008/0007973 A1    1/2008  Schreiber
2008/0073978 A1*  3/2008  Ollila et al. .................... 307/82
2008/0205093 A1    8/2008  Davies et al.

OTHER PUBLICATIONS

International Search Report of international application No. PCT/EP2011/000424 dated Jun. 26, 2012.

\* cited by examiner

CIRCUIT ARRANGEMENT FOR MODULAR DRIVE POWER CONVERTERS

CROSS REFERENCE TO RELATED APPLICATIONS

This is the U.S. National Stage of International Application No. PCT/EP2011/000424 filed Jan. 31, 2011, which was published in German under PCT Article 21(2), which in turn claims the benefit of German Application No. 10 2010 008 978.8, filed Feb. 24, 2010, Both applications are incorporated herein in their entirety.

A plurality of converter circuits are known for the purpose of the bidirectional conversion of electrical energy from direct voltage, for example, accumulators—into variable frequency three phase voltages.

A preferred field of application for these power converters is the rotationally speed control of brushless rotating field machines for motor and generator operation. Inter alia the extremely light weight of the drive system and high availability are required In particular for mobile application—such as in vehicles or aviation. Both of these requirements in combination are not fulfilled by known power converter circuits in a satisfactory manner. Known and predominantly used circuits are generally voltage source converters With regard to minimizing weight, the large capacitor banks and filter chokes required by virtue of the principle involved are troublesome—as well as to the weight of the motor cables. For mobile applications, the weight and volume of the cooling devices and the required heat exchangers is additionally of relevance. The latter-mentioned contribution can be minimized substantially only by reducing the power loss of the drive system and secondarily by as high a coolant temperature as possible. High availability of the drive system is basically achievable by means of circuit topologies with inherent redundancy of the power electronics.

Multilevel converters are advantageous, as is known, with respect to the passive filters necessary on the motor side. Respective topologies are inter alia known from IEEE TRANSACTIONS ON INDUSTRY APPLICATIONS, vol. 32, no. 3, May/June 1996, "Multilevel Converters—A New Breed of Power Converters", Authors: Jih-Sheng Lai and Fang Zheng Peng.

Any significant reduction in the size of the required capacitor banks or any improved availability, however, is not achieved. In addition, the capacitor banks on the direct voltage side of known voltage source converters together with the filter chokes and/or the parasitic power inductances on the direct voltage side form passive resonant circuits in a known manner, which can lead to disturbing vibration occurrences when stationary and transient. The size of the capacitance of the capacitor banks is in consequence also determined by the admissible amount of transient overvoltages. The theoretically possible reduction of the capacitance with increasing clock frequency of the semiconductor can therefore not be used—in particular when connecting several power converters to a common direct voltage distribution.

The topology known from DE 1010 3031A1 "Stromrichterschaltungen mit verteilten Energiespeichern/Power converter circuits with distributed energy stores" enables high availability even in the event of failure/defects of electronic components/subsystems. The strictly modular electronic design and the lower, freely selectable semiconductor voltages are of advantage. The size of the required capacitor banks, however, is a drawback also for mobile applications.

The weight of the motor cable can be reduced for known voltage source converters by choosing as high a nominal voltage as possible on he direct voltage side, so that the motors can be designed for smaller currents. Such a design, however, is not freely selectable or it is undesirable due to increasing complexity of the accumulator banks or for safety reasons. In accordance with prior art, additional DC/DC converters are therefore frequently made use of, so that at least the accumulator banks do not have to be designed for the high direct voltage of the voltage source converters on the motor side. It is very disadvantageous, however, that the DC-DC converters must be designed for full drive power output, cause further energy losses and in turn require heavy passive components—such as smoothing reactors and noise filters. Topologies are known from DE 102007013462A1 "Leistungselektronische Schaltungsanordnung für eine Drehfeldmaschine/Power electronic circuit arrangement for a rotating field machine", which make it possible—with no additional DC-DC converters—to provide the motors with higher and more regulated voltages, which are well above the supplied direct voltage. Even with these arrangements it is not possible to significantly reduce the volume and the weight of the capacitor banks required for known voltage source converters.

It is the object of the invention to provide a method and a device for bi-directional conversion of direct voltage into multiphase voltage, by means of which the drawbacks mentioned can be avoided. This object is satisfied by a device for bidirectional conversion of direct voltage into multiphase voltage via a power converter comprising a plurality of sub-modules connected in series having the features mentioned in claim 1 and by a method for controlling a power converter for the bidirectional conversion of direct voltage into multiphase voltage via a power converter comprising a plurality of sub-modules connected in series having the features mentioned in claim 8. Advantageous embodiments of the invention are the subject matter of the dependent claims.

Other aims are to unite the advantages mentioned of the arrangements known from DE 10103031A1 and DE 102007013462A1 and to avoid the aforementioned drawbacks. These are, as already explained, in particular the following issues:

1) modular feasibility of the power electronics from a selectable number of identical so-called sub-modules (10)
2) possibility of continuing the power converter's operation during defects of a sub-module (10)
3) ability to function without the bulky passive components—in particular without capacitors in parallel for supplying direct voltage
4) possibility of using semiconductors having low reverse voltage compared with the supplied direct voltage—in particular, field-effect transistors.
5) low power loss compared with known voltage source converters
6) low need for internal energy stores by virtue of the principle involved, compared with known voltage source converters
7) good suitability for direct mounting/installation on rotating field machines

These advantages are achieved by the inventive measures according to the claims.

Figure 1:
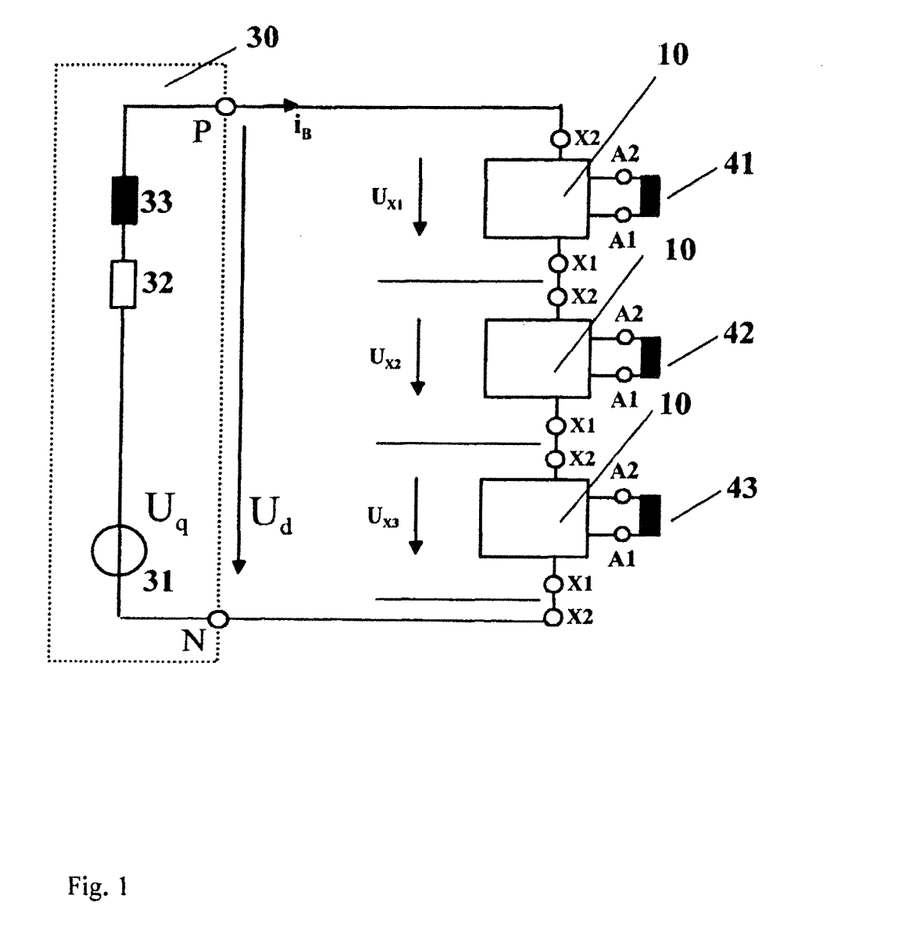
FIG. 1 illustrates an embodiment of a circuit arrangement including three sub-modules connected to a direct voltage source.

FIG. 1 shows a circuit arrangement according to the invention with a number of, for example, three sub-modules (10) connected to a direct voltage source (30). The latter is illustrated like a substitute circuit as an ideal source (31) with parasitic internal resistance (32) and leakage inductance (33). The load-dependent direct voltage ($U_d$) is applied at its terminals (P) and (N). By means of a direct voltage distribution with cables or bus bars, further drive systems and other loads can be connected in parallel. This allows the direct voltage to fluctuate significantly and unexpectedly, which for conventional voltage source converters causes significant stray electric currents and current oscillations in the capacitor banks.

According to the invention, all sub-modules (10) are by means of their direct voltage terminals (X1, X2) connected in series to the direct voltage source (30). Appropriate and advantageous internal circuit topologies of the sub-modules (10) are explained further below. Every sub-module (10) is each attached to a respective stator winding (41 to 43) of the associated rotating field machine.

This allocation and distribution of the stator windings (41-43) is explained in the following, because it does not correspond to the star or delta circuit common in rotating field machines.

Figure 2:
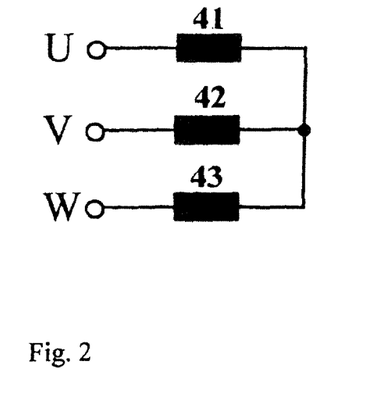
FIG. 2 illustrates an embodiment of a circuit arrangement including stator windings of a rotating field machine connected in star circuitry.

FIG. 2 for further illustration by way of example shows the stator windings (41 . . . 43) of a conventional rotating field machine, which is connected in a known manner in star circuitry. A power converter (generally a conventional voltage source converter), generating three voltages phase-shifted against each other, is connected to the external motor terminals (U, V, W). In the circuit arrangements according to the invention, the stator windings are separately and individually supplied with respectively phase-shifted voltages. This is necessary in order to achieve the advantages of the invention. The separate arrangement of the stator windings is equivalent and generally known for the operation of the drive system. The circuitry separation of the stator windings can in practical application show drawbacks which under the present ancillary conditions of the invention, however, are of very little relevance:

If the supplying power converter generates interfering harmonics having a harmonic order divisible by 3, then they no longer neutralize each other in their effect on the machine. This issue, however, is at present not relevant for general, low-harmonic supply with multi-level voltage and high realizable pulse frequency.

The number of electrical connections between the machine and the power converter increases. This issue is negligible only if the power converter and the electric machine can be integrally constructed. To make this possible is an object of the invention (see the aforementioned Item 7)).

Figure 3:
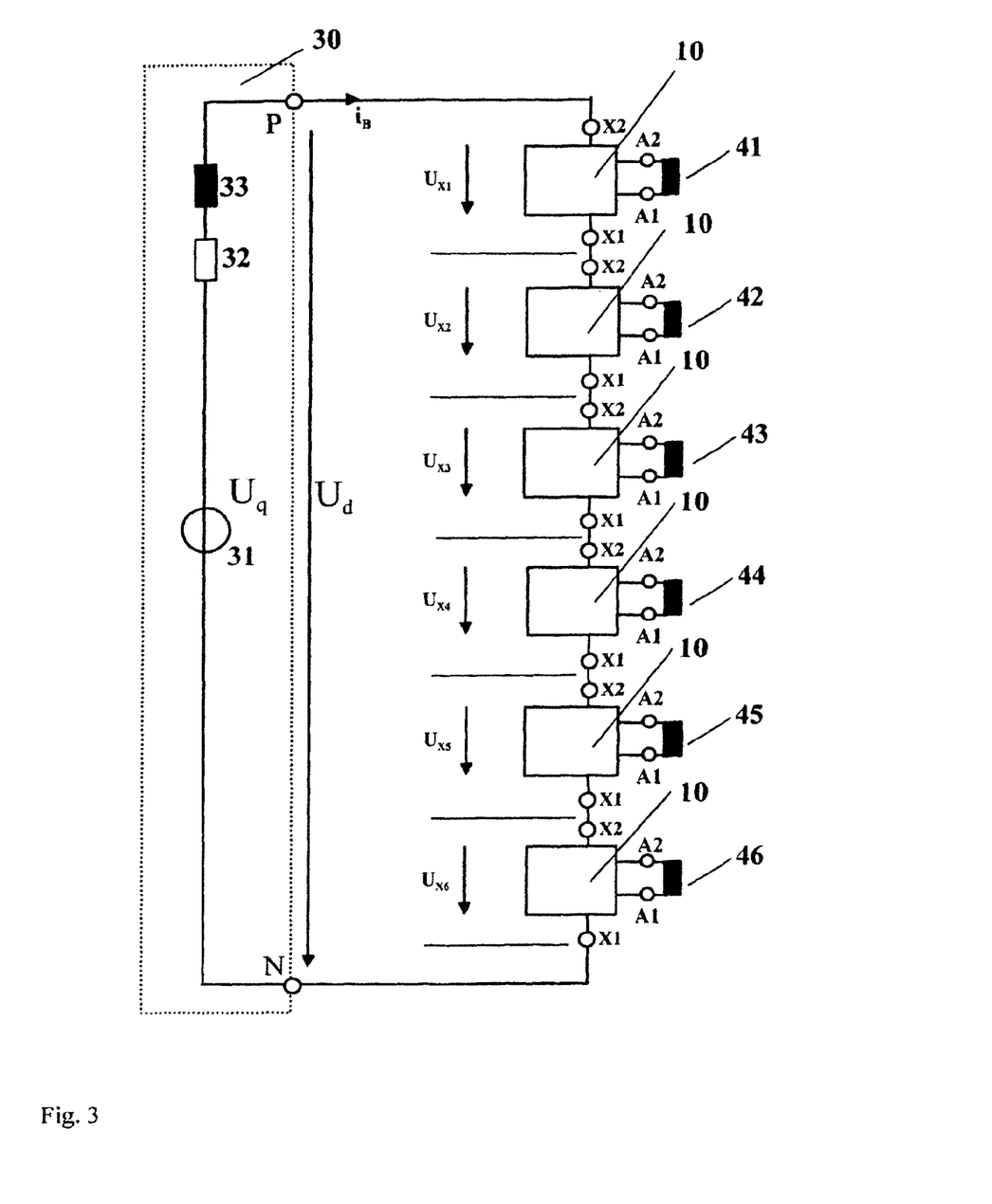
FIG. 3 illustrates an embodiment of a circuit arrangement including six sub-modules.

FIG. 3 shows a circuit arrangement according to the invention similar to FIG. 1, but with a higher number of sub-modules (10). n=6 sub-modules (10) are here used by way of example. Following the invention, basically any number of (more than two) sub-modules (10) can be used. Rotating field machines which already by virtue of the principle involved have a constructive distribution of stator windings into partial windings, are particularly well suited for the circuit arrangement according to the invention with a larger number of sub-modules. Such electrical machines are e.g. permanent-magnet machines with single tooth winding in the stator or transverse flux machines. An arrangement with a larger number (n) of sub-modules provides inter alia the advantage of better behavior in the event of malfunction or defect of a sub-module (redundancy event).

The circuit arrangement according to the invention can then subject to the following, favorable conditions continue to operate with reduced maximum output:

The terminal voltage ($U_x$) on the direct voltage side of the affected sub-module is approx. $U_x=0$.

The terminal voltage ($U_w$) on the alternating current side of the affected sub-module is approx. $U_w=0$.

These conditions correspond to an internal short circuit at all poles of the affected sub-module (10). It ensures that the sub-module picks up no significant power and can not overheat nor burn under an arc effect. This condition can be adjusted by respective control of the sub-module, as shown below in the explanation of the switching states according to Tab. 1. It is more important, however, that this state is automatically set in the event of control errors or defects of the power-electronic switches ((1) to (6)), if only the contacts of the semiconductor chips do not burn or open and they can continue to carry the operation currents.

The requirements for this in the circuit arrangements according to the invention are very favorable, because the high discharge energies—destroying the contacts—of the large direct voltage capacitors of conventional voltage source converters and the subsequent high short circuit currents of the direct voltage source (30) do not occur. These advantages result from the fact that, according to the invention, the internal storage capacitors (9) of the sub-modules (10) can be sized much smaller and the direct voltage source (30) is not short-circuited. The lacking direct voltage portion (e.g. $U_{x1}$) of the defective sub-module (10) can be compensated by correspondingly higher excited portions (e.g. $U_{x2}$ to $U_{x6}$) of the still controllable intact sub-modules (10).

As is known from other technical systems with inherent redundancy, a minor design provision of the basic dimensioning is to be provided for this purpose. In other words, in the present case, the max. allowable voltages of (n-1) sub-modules must be higher than the max. voltage of the direct voltage source. A defective sub-module can always be detected by conventional methods due to its deviating parameters collected during operation. The connected rotating field machines can be dimensioned such that the contacts of the semiconductor chips—or the stator winding itself—are not destroyed by the resulting fault currents.

Other additional measures, such as additional short-circuiting switches or circuit breakers, are also possible and known. The circuit arrangements according to the invention, however, as explained, provide comparatively very favorable ancillary conditions to enable redundant continuance of operations without any additional measures. Any universally valid statement is not possible, however, because the current carrying capacity of the semiconductor contacts is for the individual case to be considered quantitatively.

Figure 4:
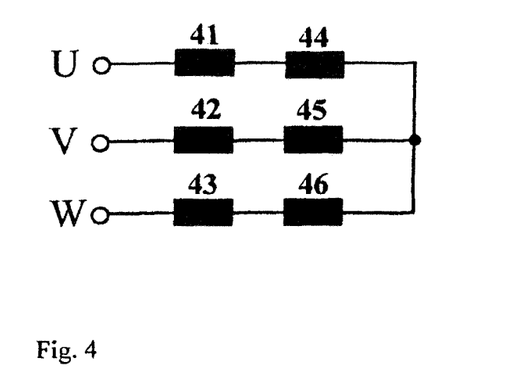
FIG. 4 illustrates an exemplary arrangement of stator windings of a rotating field machine similar to the arrangement of FIG. 3.

FIG. 4, for further explanation of FIG. 3, by way of example shows the arrangement of the stator windings (41-46) of possibly associated three-phase rotating field machine to FIG. 3. The number of phases of the rotating field machine is for the circuit arrangement according to the invention freely selectable, as each sub-module (10) from a pure control perspective can be controlled with any phasing. Therefore, it is also possible, for example, that the six stator windings (41 to 46) in FIG. 3 belong to a six-phase machine, The terminals (A1, A2) on the alternating current side of either one, or of a part of all of the sub-modules (10), can each form one of at least two phase-angle offset phases of the multi-phase system.

Figure 5:
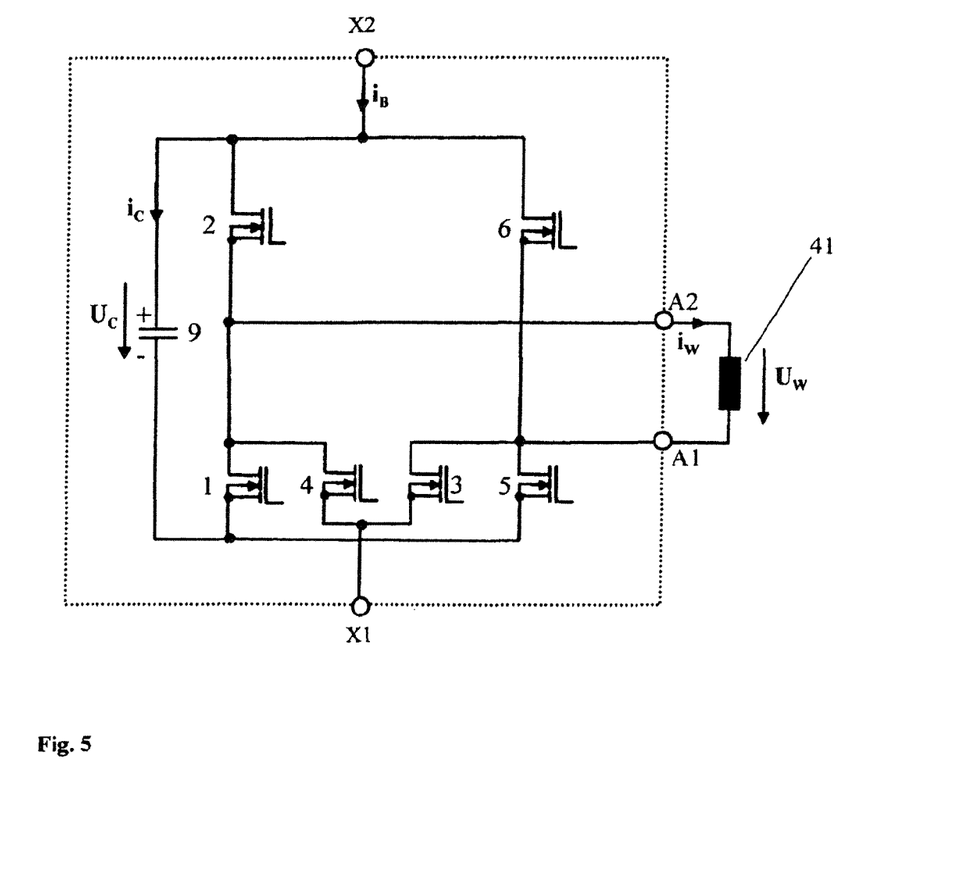
FIG. 5 illustrates an embodiment of the internal circuitry of a sub-module.

FIG. 5 shows an advantageous internal circuit of a sub-module (10) according to the invention. It comprises six controllable electronic switches ((1) to (6)) and a single-polar storage capacitor (9). The controllable electronic switches ((1) to (6)) are illustrated as field-effect transistors (T1 to T6), which corresponds to the preferred embodiment. Other semiconductor switches can be used, provided they are of the reverse conducting type. The associated controllable switching states are provided n Tab. 1 and Tab. 2 for further explanation the mode of operation. The switching states mentioned in Tab. 1 are generally at least required to be able to use and control the sub-module (10) according to the invention.

In addition, there exists (as a special case) another state in which all 6 electronic switches ((1) to (6)) are switched off. This is only of interest for stopping the drive and is discussed in connection with FIG. 7 and FIG. 8

Other switching states are possible in principle when expanding or modifying the internal circuitry of the sub-modules, but not necessary.

Tab. 1 is explained in more detail below. It associates the operatively controllable switching states of the sub-module (10) with the external terminal sizes. This basic functionality according to the invention applies regardless of the internal circuitry selected for the sub-module. When specifying the direct voltage of the single-polar storage capacitor (9) it is true for the terminal voltage ($U_x$) on the direct voltage side that:

$$U_x = K_1 \cdot U_c$$

For the terminal voltage ($U_w$) on the alternating voltage side it is true that:

$$U_w = K_2 \cdot U_c$$

The factors $K_1$ and $K_2$ are the control variables, which can be predetermined by certain combinations of switching states of the controllable electronic switches of the sub-module. When having knowledge of—or when measuring—the terminal currents on the direct voltage side ($i_B$) and the alternating voltage side ($i_w$), the resulting current ($i_C$) of internal storage capacitor (9) can be directly specified:

$$i_C = K_1 \cdot i_B - K_2 \cdot i_W$$

All three equations are valid for the values at present as well as for the (arithmetic) mean values of the voltages and currents. Furthermore, they are valid for any polarity and for both energy directions. Generation of the desired fundamental frequency and phasing of the parameters on the alternating voltage side is performed in a known manner—preferably by means of a high predetermined clock frequency and a pulse width modulation. On the alternating voltage side, the discrete voltage values $U_W=+U_C$, $U_W=0$ and $U_W=-U_C$ can be set (multilevel). This in connection with the very high clock frequency—enabled by the low-voltage semiconductors—enables very good low-harmonic supply of the rotating field machine and a high dynamic response. In each clock cycle of the pulse width modulation, the mean terminal voltage on the direct voltage side can further be adjusted by pulse width modulation such, that it is proportional in good approximation to the power presently at the terminals on the alternating current side. In this manner, the energy requirement (per clock cycle) from the storage capacitor (9) theoretically turns to zero. It is achievable in practice, that the required energy is minimized at least to the extent that the storage capacitor must only compensate small differences of the energies over a few clock cycles. From this method, a pulsation (according to the power performance of the alternating voltage side) of the terminal voltage ($U_x$) of the sub-module results at twice the fundamental frequency. According to the invention, it is only by adding the terminal voltage of the other sub-modules with different phasing compensated, so that the resulting direct voltage to the battery side contains only the clock frequency as a disturbance frequency. The latter can be further increased in a known manner by a phase shift of clock cycles.

Motor and generator operation of the connected rotating field machine (bidirectional power flow) is according to the invention possible without restriction. In the technical implementation, of course only one polarity of the voltage of the direct voltage supply (30) and one polarity of the voltage ($U_c$) of the storage capacitor (9) is predetermined. During generator operation, the battery current ($i_B$) of the direct voltage supply (30) then consequently has a negative polarity ($i_B < 0$).

Tab. 2—in supplementation of Tab. 1—shows assignment of the switching states according to Tab. 1 to the switching states of the controllable electronic switches (T1(1), T2(2), T3(3), T4(4), T5(5), T6(6)), when in particular the embodiments according to the invention of the inner circuit of the sub-modules according to FIG. 5, 6, 7 or 8 are used. These embodiments according to the invention have advantages regarding the technical realization with respect to semiconductor complexity, semiconductor power loss and connection technology—as will be explained below.

Figure 6:
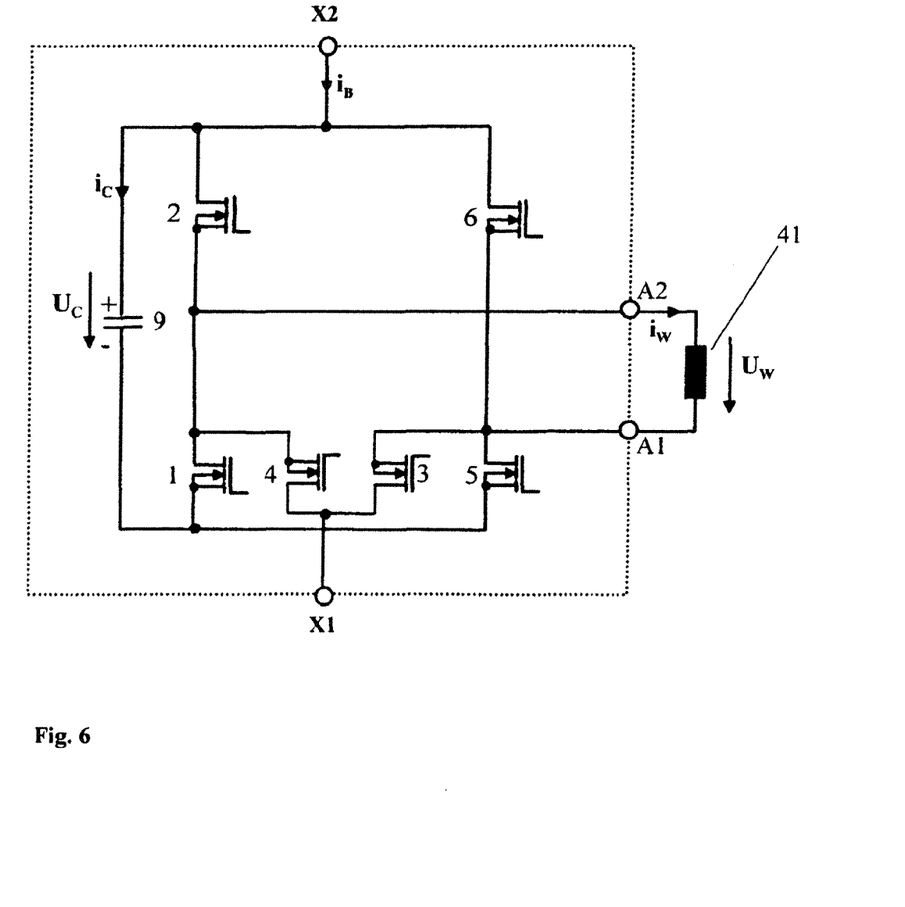
FIG. 6 illustrates another embodiment of the internal circuitry of a sub-module in which the controllable electronic switches are inserted with reversed power connections.

FIG. 6 shows a sub-module according to the invention, in which—contrary to FIG. 5—the controllable electronic switches (T3 (3), T4 (4)) are inserted each with reversed power connections. This does not change the functionality (according to Tab. 1 and Tab. 2). When using field-effect transistors as electronic switches, this means that in FIG. 6, the terminal (X1) on the direct current side is formed by the two drain electrodes of the transistors (T3, T4). This can be advantageous for a highly integrated or monolithically integrated realization of the sub-module because the externally accessible connections are thereby located on the large-surface rear side of the semiconductor chips and, e.g. do not need to be connected via on-board wires. This also applies in (FIG. 6) for the other external connections (X2 corresponds to drain of T2, T6, A1 corresponds to drain of T5, A2 corresponds drain of T1).

A further advantage of the devices according to the invention is the very low voltage of the semiconductors—compared with the supplying direct voltage. This has a number of advantages regarding semiconductor physics and technical advantages:

Very good conditions for the monolithic integration together with the low-voltage technology of the associated control electronics Greater safeguarding against insulation failure in wet and dirty environment Very high achievable clock frequencies due to low switching losses High permissible semiconductor temperatures The latter item is generally known from semiconductor physics: For a given semiconductor material, the technically sensibly achievable operational limit temperature is significantly higher for low-voltage technology. Especially when using field-effect transistors, the design with lower voltage results in a further advantage that makes it possible to reduce the power loss. With easily accessible forward voltages (below 0.4 V for silicon) the parasitic on-chip pn junctions of the inverse diodes can for any semiconductor current direction always remain blocked, thereby avoiding switching losses of the inverse diode. This is done in a known manner by switching-on the channel of the field-effect transistor as a side effect of actuating the gate. Additional anti-parallel diodes (generally, Schottky diodes) are thereby dispensable and the semiconductor surface of the field-effect transistor is effectively utilized also for a negative current direction. These advantageous effects can, due to the higher breakdown voltages, technically no longer be advantageously used with components having a high inverse voltage.

Figure 7:
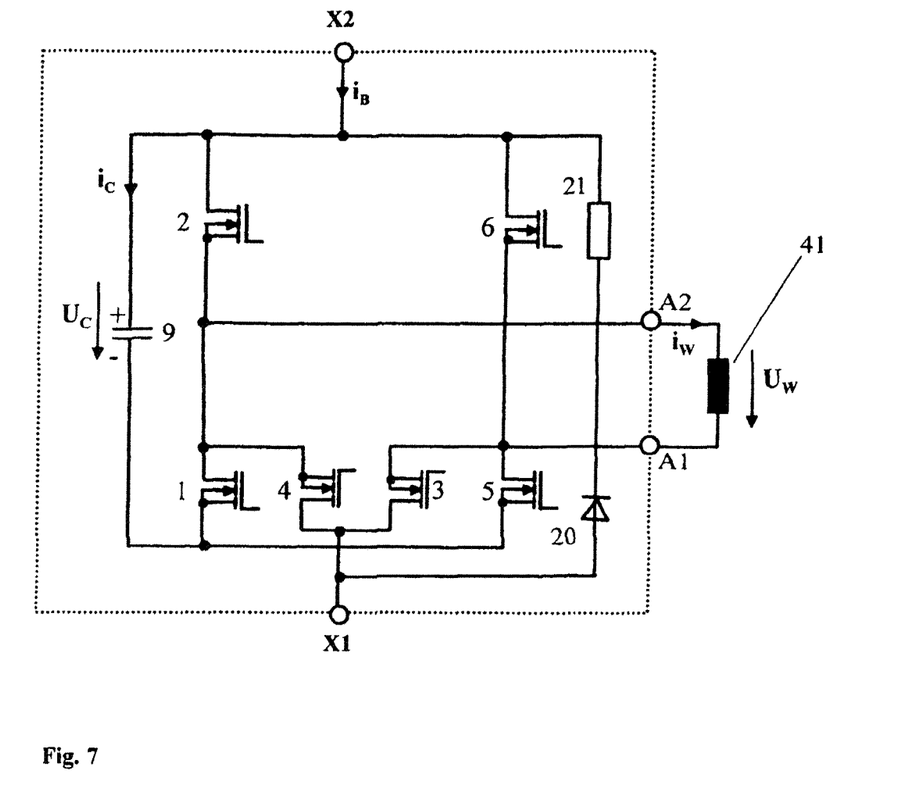
FIG. 7 illustrates the sub-module of FIG. 6 including a protective element.

FIG. 7 shows an embodiment of the sub-module according to FIG. 6 with an additional protective element. This is essentially a protective diode (20) and optionally a damping resistor (21), which, however, need not necessarily be present. The components are not required during normal operation. The protective element is useful where the current on the direct current side (battery current ($i_B$)) is suddenly switched off during operation and the drive is to be blocked as quickly as possible by turning off all transistors. In such an event, the semiconductor currents are limited by means of the protective diode, so that the semiconductor voltages do not exceed the values occurring during normal operation.

Figure 8:
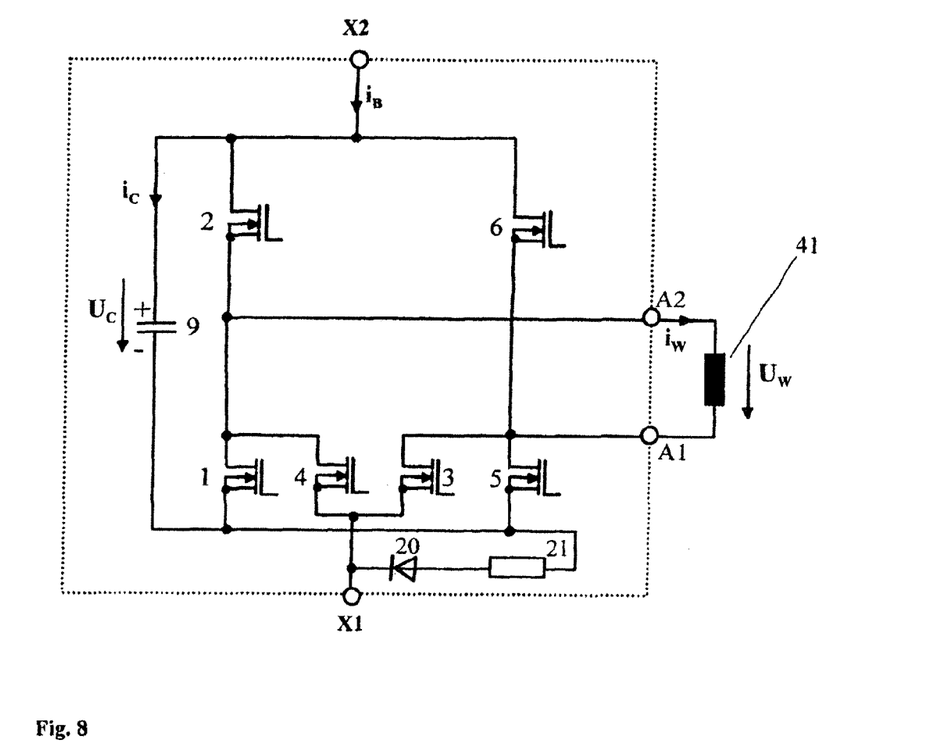
FIG. 8 illustrates the sub-module of FIG. 6 including a protective element installed in the adapted direction of operation.

FIG. 8 shows an embodiment of the sub-module according to FIG. 6 with an additional protective element. The mode of operation and the explanation correspond to those of FIG. 7. Only that the protective diode is respectively also installed in the adapted direction of operation—due to the reverse direction of installation of (T3, T4).

TABLE 1

| Nr. | $K_1$ | $K_2$ | $U_x$ | $U_w$ | $i_C$ |
|---|---|---|---|---|---|
| 0 | 0 | 0 | 0 | 0 | 0 |
| 1 | 0 | 1 | 0 | $+U_C$ | $0 - i_W$ |
| 2 | 1 | 1 | $+U_C$ | $+U_C$ | $(+i_B - i_W)$ |
| 3 | 1 | 0 | $+U_C$ | 0 | $+i_B + 0$ |
| 4 | 1 | −1 | $+U_C$ | $-U_C$ | $(+i_B + i_W)$ |
| 5 | 0 | −1 | 0 | $-U_C$ | $0 + i_W$ |

TABLE 2

| Nr. | V. | $K_1$ | $K_2$ | T1 | T2 | T3 | T4 | T5 | T6 |
|---|---|---|---|---|---|---|---|---|---|
| 0 | .0 | 0 | 0 | 0 | 0 | 1 | 0 | 1 | 0 | 1 |
| 0 | .1 | 0 | 0 | 0 | 0 | 1 | 1 | 0 | 0 | 1 |
| 0 | .2 | 0 | 0 | 0 | 0 | 1 | 1 | 1 | 0 | 1 |
| 1 | .0 | 0 | 1 | 0 | 1 | 0 | 1 | 1 | 0 |
| 2 | .0 | 1 | 1 | 0 | 1 | 1 | 0 | 1 | 0 |
| 3 | .0 | 1 | 0 | 1 | 0 | 1 | 0 | 1 | 0 |
| 3 | .1 | 1 | 0 | 1 | 0 | 0 | 1 | 1 | 0 |
| 3 | .2 | 1 | 0 | 1 | 0 | 1 | 1 | 1 | 0 |
| 4 | .0 | 1 | −1 | 1 | 0 | 0 | 1 | 0 | 1 |
| 5 | .0 | 0 | −1 | 1 | 0 | 1 | 0 | 0 | 1 |

The invention claimed is:

1. Device for bi-directional conversion of direct voltage of a direct voltage supply into a variable-frequency multi-phase voltage of a multi-phase voltage system with a power converter circuit comprising a plurality of identically designed sub-modules each being clocked with a clock frequency, which each comprise two terminals on the direct current side and two terminals on the alternating current side, where said sub-modules are connected in series by means of their terminals on the direct current side, so that the first terminal of the first sub-module and the second terminal of the last sub-module are connected to said direct current supply;

where said terminals on the alternating current side of either one, or of a part of all sub-modules each form one of at least two phases of said multi-phase voltage system, and where said sub-modules are further designed such that the time course of said voltage at said terminals on the direct current side of each sub-module averaged over a few clock cycles can be controlled such that it is proportional to the power that is delivered to or received at said terminals on the alternating current side so that a storage capacitor of each sub-module must compensate only the comparatively low required energy between individual clock cycles of said clock frequency, and said voltages of said terminals on the direct current side of all sub-modules therefore add up to the voltage value of said direct voltage supply.

2. Device according to claim 1, where said power converter circuit is specifically designed to supply a rotating field machine.

3. Device according to claim 2, where each individual winding of said rotating field machine is divided into a group of individual partial windings, so that each group of sub-modules with the same phase supplies a respective group of partial windings.

4. Device according to claim 3, where semiconductors with low inverse voltage can be used in said sub-modules.

5. Device according to claim 4, where said sub-modules are clocked in such a phase-shifted manner that a resulting frequency of noise to said direct voltage supply results from said clock frequency multiplied by said number of sub-modules.

6. Device according to claim 3, where field-effect transistors can be used in said sub-modules.

7. Device according to claim 6, where said sub-modules are clocked in such a phase-shifted manner that a resulting frequency of noise to said direct voltage supply results from said clock frequency multiplied by said number of sub-modules.

8. Device according to claim 3, where each sub-module comprises switching transistors T1, T2, T3, T4, T5 and T6 as well as said storage capacitor, where each switching transistor comprises two power connections and a control connection;

wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

9. Device according to claim 2, where each sub-module comprises switching transistors T1, T2, T3, T4, T5 and T6 as well as said storage capacitor,
where each switching transistor comprises two power connections and a control connection;
wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and
where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

10. Device according to claim 1, where semiconductors with low inverse voltage can be used in said sub-modules.

11. Device according to claim 10, where each sub-module comprises switching transistors T1, T2, T3, T4, T5 and T6 as well as said storage capacitor,
where each switching transistor comprises two power connections and a control connection;
wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and
where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

12. Device according to claim 1, where field-effect transistors can be used in said sub-modules.

13. Device according to claim 12, where each sub-module comprises switching transistors T1, T2, T3, T4, T5 and T6 as well as said storage capacitor,
where each switching transistor comprises two power connections and a control connection;
wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and
where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

14. Device according to claim 1, where said sub-modules are clocked in such a phase-shifted manner that a resulting frequency of noise to said direct voltage supply results from said clock frequency multiplied by said number of sub-modules.

15. Device according to claim 14, where each sub-module comprises switching transistors T1, T2, T3, T4, T5 and T6 as well as said storage capacitor,
where each switching transistor comprises two power connections and a control connection;
wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and
where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

16. Device according to claim 1, where each sub-module comprises switching transistors T1, T2, T3, T4, T5 and T6 as well as said storage capacitor,
where each switching transistor comprises two power connections and a control connection;
wherein said terminals on the direct current side are connected by a bridge circuit consisting of four transistors T2, T3, T4 and T6 to said terminals on the alternating current side so that the respective first power connection of T2 and T6 is connected to the second terminal on the direct current side, the respective second power connection of T4 and T3 is connected to the first terminal on the direct current side, the second power connection of T2 is connected to the first power connection of T4 and the second terminal on the alternating current side, and the second power connection of T6 is connected to the first power connection of T3 and the first terminal on the alternating current side; and
where the first connection of said storage capacitor is connected to a terminal on the direct current side and the second connection of said storage capacitor is connected to the respective second connection of said two transistors T1 and T5, the respective first connection of which is each connected to one of said terminals of the alternating current side.

17. Method for controlling a power converter circuit comprising a plurality of identically designed sub-modules being clocked with a clock frequency for bi-directional conversion of direct voltage of a direct voltage supply into a variable-frequency multi-phase voltage of a multi-phase voltage system, where said sub-modules, each comprising two terminals on the direct current side and two terminals on the alternating current side, are in their clocking and pulse width controlled such that said terminals on the alternating current side of either one, or of a part of all sub-modules each form one of at least two phases of said multi-phase voltage system;

the time course of said voltage at said terminals on the direct current side averaged over a few clock cycles is proportional to the power that is delivered to or received at said terminals on the alternating current side so that a storage capacitor of each sub-module must compensate only the comparatively low required energy between individual clock cycles; and the voltages of said terminals on the direct current side of all sub-modules add up to the voltage value of said direct voltage supply.

18. Method according to claim 17, wherein the control of said power converter circuit is used to control a rotating field machine with respect to rotational speed and torque.

19. Method according to claim 18, where said sub-modules are controlled in a phase-shifted manner with respect to their clocking so that a resulting frequency of noise to said direct voltage supply results from said clock frequency multiplied by said number of sub-modules.

20. Method according to claim 19, where said sub-modules are controlled in a phase-shifted manner with respect to their clocking so that a resulting frequency of noise to said direct voltage supply results from said clock frequency multiplied by said number of sub-modules.

* * * * *